R. P. CHRISTENSEN.
RECORD REPEATING DEVICE FOR SOUND REPRODUCING INSTRUMENTS.
APPLICATION FILED MAR. 15, 1917.

1,340,524.

Patented May 18, 1920.

Witness:
E. M. Schweiger

Rasmus P. Christensen, Inventor.
By Emil Neuhardt
Attorney.

R. P. CHRISTENSEN.
RECORD REPEATING DEVICE FOR SOUND REPRODUCING INSTRUMENTS.
APPLICATION FILED MAR. 15, 1917.
1,340,524.
Patented May 18, 1920.
3 SHEETS—SHEET 2.
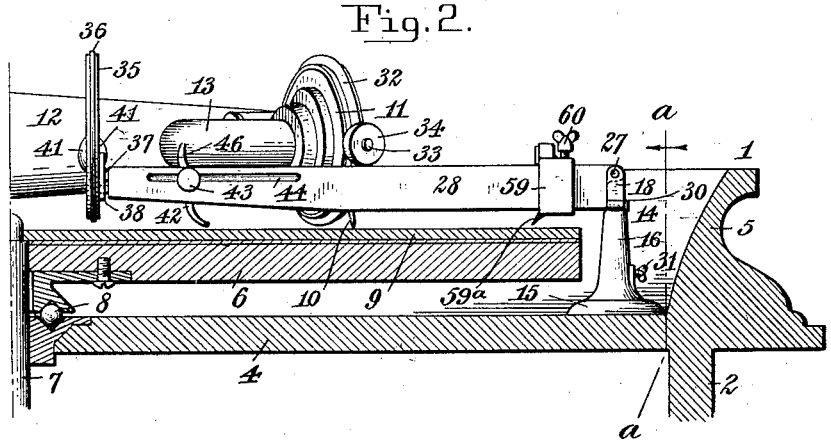
Fig. 2.
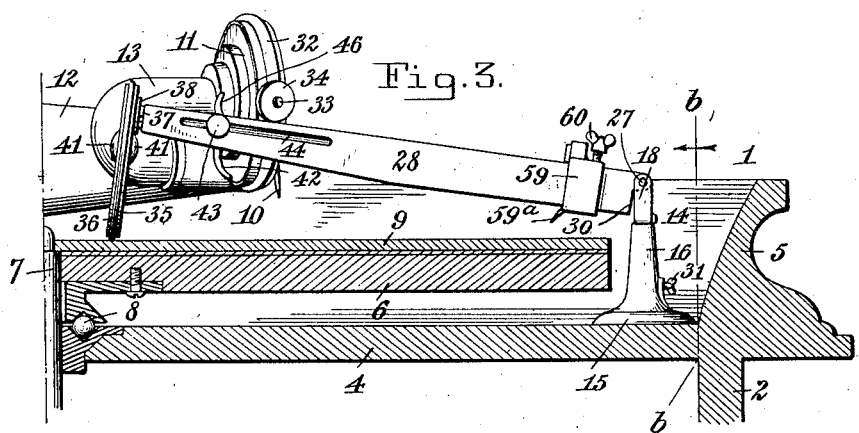
Fig. 3.
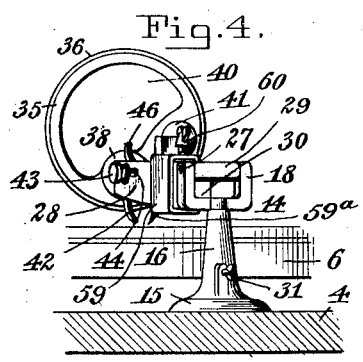
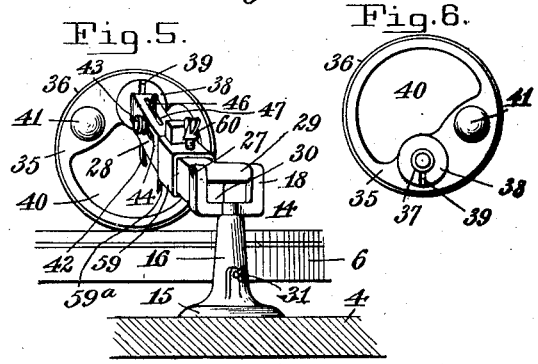
Witness:
E. M. Schweiger.
Rasmus P. Christensen, Inventor.
By Emil Neubert
Attorney.

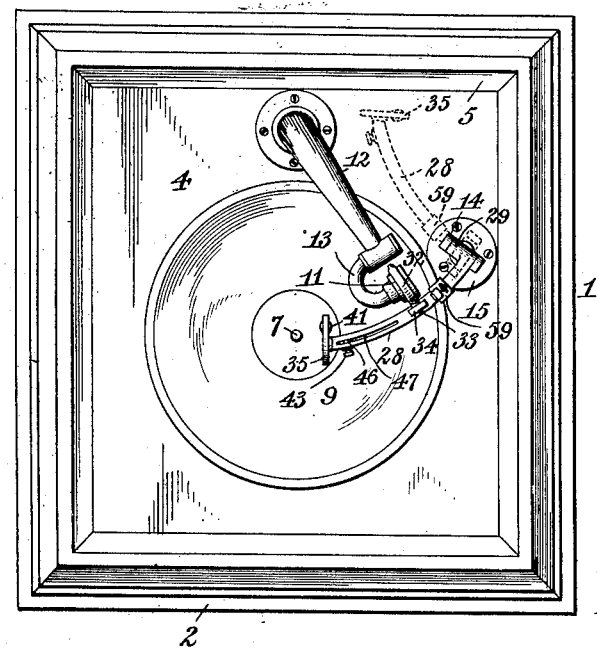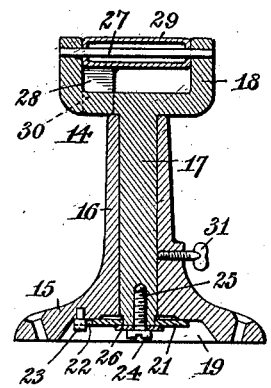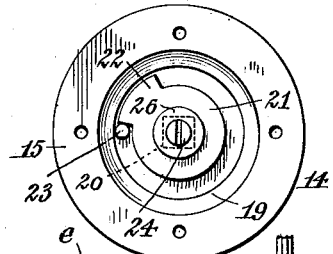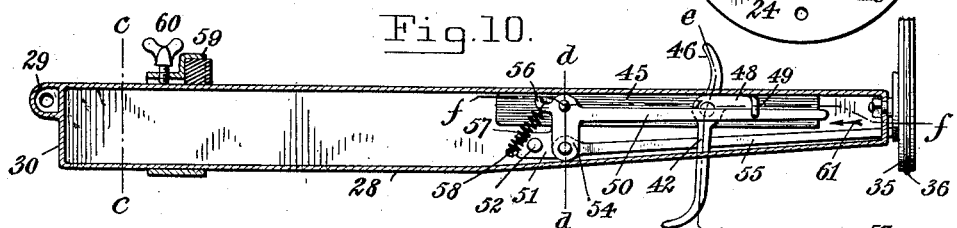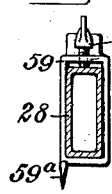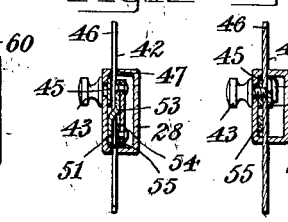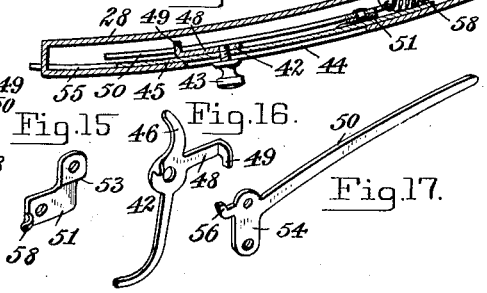

UNITED STATES PATENT OFFICE.

RASMUS P. CHRISTENSEN, OF BUFFALO, NEW YORK, ASSIGNOR OF ONE-HALF TO CLARENCE O. JOHNSON, OF BUFFALO, NEW YORK.

RECORD-REPEATING DEVICE FOR SOUND-REPRODUCING INSTRUMENTS.

1,340,524. Specification of Letters Patent. Patented May 18, 1920.

Application filed March 15, 1917. Serial No. 154,944.

*To all whom it may concern:*

Be it known that I, RASMUS P. CHRISTENSEN, a citizen of the United States, residing at Buffalo, in the county of Erie and State of New York, have invented certain new and useful Improvements in Record-Repeating Devices for Sound-Reproducing Instruments, of which the following is a specification.

My invention relates to improvements in record repeating devices for sound reproducing machines.

The object of my invention is to provide an improved repeating device having adjustable stops whereby any portion or the whole of the record may be repeated.

Another object of my invention is the production of a device of the kind mentioned which will positively return the sounding box of the reproducer to the starting point of the record while gently lowering the needle into contact with the record, thus assuring full protection to the record and guarding against injury to the needle.

Another object of my invention is the provision of a repeating device which can be easily attached to any disk-playing sound reproducing machine and which may be swung into inoperative position so that the record may be played in the usual manner without repeating.

A still further object is, the provision of a device of the character described, which is simple in construction, effective in operation, and comparatively inexpensive.

The invention consists in a skid or guide member for coöperation with the reproducer of the machine, and which is equipped with means for elevating one end of said skid or guide member so as to automatically return the reproducer to the starting point of a record.

It further consists in providing said skid or guide member with adjustable stops so that when said member is actuated, any desired portion of the record may be repeated.

It further consists in a skid or guide member having means at one end for elevating said end when the reproducer reaches the end of the record so as to cause said reproducer to return to the starting point of said record.

It further consists in the novel features of construction and in the arrangement and combination of parts to be hereinafter described and more particularly pointed out in the subjoined claims.

In the drawings,—

Fig. 2 is a transverse section through one-half of the upper portion of the sound reproducing machine, with the cover removed, the repeating device being shown in normal position.

Fig. 3 is a similar view of the repeating device in a position in which it automatically returns the reproducer to the starting point of the record, or to any other desired point from which the record is to be repeated.

Fig. 4 is a section taken on line $a$—$a$, Fig. 2, looking in the direction of the arrow crossing said line.

Fig. 5 is a section taken on line $b$—$b$, Fig. 3, looking in the direction of the arrow crossing said line.

Fig. 6 is an elevation of the eccentric whereby the skid or guide member of the device is actuated to place the same in inclined position.

Fig. 7 is a plan view of a sound reproducing machine with the cover removed.

Fig. 8 is an enlarged vertical section through the skid or guide support.

Fig. 9 is an inverted view of the same.

Fig. 10 is a longitudinal section through the skid or guide member.

Fig. 11 is a cross section taken on line $c$—$c$, Fig. 10.

Fig. 12 is a cross section taken on line $d$—$d$, Fig. 10.

Fig. 13 is a cross section taken on line $e$—$e$, Fig. 10.

Fig. 14 is a longitudinal section taken on line $f$—$f$, Fig. 10, the eccentric and its shaft being omitted.

Figs. 15 to 17 are perspective views showing in detail parts of the actuating devices forming part of said skid or guide member.

Referring now to the drawings in detail, like numerals of reference refer to like parts in the several figures.

Figure 1:
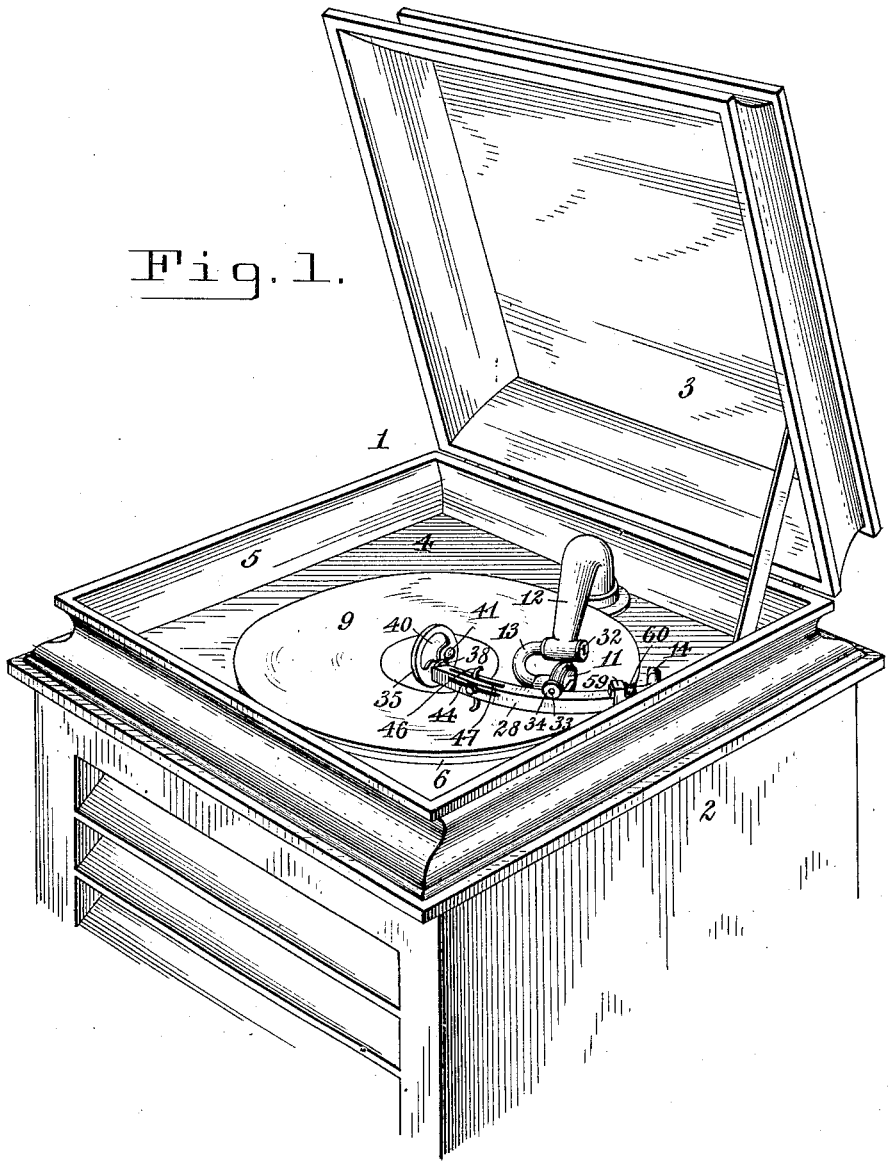
Figure 1 is a perspective view of the upper end of a sound reproducing machine to which my improved repeating device is attached.

The reference numeral 1 designates the sound reproducing machine having a casing 2 including a cover 3 hinged to the body portion of the casing in the usual manner.

The body portion of the casing has a top wall 4 and a curb wall 5 projecting upwardly from said top wall. Within the space bounded by said curb wall is situated the rotating or turn table 6 which is secured to a spindle 7 in the usual manner, an anti-friction bearing 8 being provided for said table and spindle. 9 designates the record disk which is placed upon the rotating or turn table 6 and against which is held the needle 10 of a sound box 11 supported on a reproducer arm 12 oscillatable on a vertical axis. This sound box 11 may be supported from said reproducer arm 12 by means of a goose neck 13, but in machines of different makes, the sound box is differently supported; all of which, however, forms no part of this invention.

This invention is designed for use in connection with different makes of sound reproducing machines, and in preferred form comprises a support or standard 14 having a circular base 15 and a hollow upwardly tapering tubular portion 16 into which is adapted to fit for rotation the spindle 17 of a supporting fork 18, said fork being preferably integral with said spindle. The base 15 is provided on its underside with a circular depression 19 into which the extremity of the spindle 17 projects, said extremity being of square formation in cross section at its lower end, as shown in dotted lines at 20 in Fig. 9.

21 designates a stop disk provided with a square opening to fit over the square lower end of the spindle 17, this disk having a stop portion 22 projecting from its edge, either end of which projecting portion is adapted to bear against a stop pin 23 secured within the base 15 and projecting into the plane of said stop portion. Said stop disk is secured to the spindle 17 by means of a screw 24 which is passed axially through said disk and takes into a tapped opening 25 formed axially in the spindle 17, a washer 26 being preferably interposed between said stop disk and the head of said screw.

Pivotally mounted in the forked upper end of the spindle 17 by means of a horizontal pivot pin 27 is a skid or guide bar 28 which is preferably curved on an arc of a circle having its axis coincident with the axis of the reproducer arm 12. Said skid or guide bar is preferably constructed of sheet metal of rectangular formation in cross section which may be stamped in channel shape to have its upper and lower walls and one of its side walls integral, with the other side wall welded to the free edges of the upper and lower walls. While in the drawings this arrangement is shown, it is apparent that this bar may be otherwise constructed.

As clearly shown in the drawings, the support 14 is screwed or otherwise secured to the top wall 4 of the body portion of the casing at a point in proximity to the peripheral edge of the rotating or turn table and the skid or guide arm extends inwardly from this support on a curved line to a point in proximity to the spindle 7, the upper portion of which latter extends through the axial opening in the record disk. The inner pivoted end of said skid or guide arm is provided with a pivot lug 29 and the end of the bar exposed between said lug acts as a stop, which I have designated by the numeral 30 and which bears against the forked portion 18 so as to limit the downward swinging movement of said arm.

It is to be noted that when the skid or guide arm is properly positioned over the record disk, one end of the stop projection 22 of the stop disk 21 bears against the stop pin 23 of the support and thus limits the movement of the skid or guide arm in one direction, and since the screw 24 presses said stop disk against the base 15 of said support, the friction between the two serves to retain said skid or guide arm in operative position. As a matter of safety, however, I prefer to employ a set screw 31, which is passed through the tapering tubular portion 16 of the support and bears against the spindle 17 within said tubular portion, thus absolutely preventing rotation of the spindle within said tubular portion.

Surrounding the sound box 11 is a metallic strap 32 which may be constructed in any suitable manner, and on this strap is an arbor 33 on which a guide wheel or roller 34 is mounted, said roller being designed to travel in contact with the upper face of the skid or guide bar, at least in one direction. In the drawings I have shown the guide wheel or roller 34 adapted to travel in contact with the guide bar during the inward movement of the reproducer, but if desired this wheel or roller may be positioned out of contact with said arm during such movement without in any manner affecting the operation of my device.

Mounted for rotation on the free end of the skid or guide arm 28 is an eccentric wheel 35, having preferably a rubber or other contact portion 36 adapted to travel in contact with the record disk when released for rotation, as will presently be explained. This eccentric wheel is best shown in Fig. 6; it being provided with a hub 37 and an annular boss 38 around said hub provided with a radial slot 39. In normal position the major portion or throw of the eccentric wheel is directed upwardly, and in order to reduce the weight of said wheel it is provided with a large opening 40. Said wheel is also provided with heavy lateral projections 41 which serve as weights to cause rotation of the wheel immediately it is released, the tendency of the weights being to assume a position underneath the axis of the wheel, but since the wheel is arrested against movement when in normal position with the weights to one side of a vertical plane passing through the axis of the wheel, and above a plane passing horizontally through said wheel, the latter is held out of contact with the record disk when the parts of the device are in normal position, as shown in Fig. 2.

Within the hollow skid or guide arm is arranged an adjustable trip lever 42 which is adapted to swing on a set screw 43 passing through a longitudinal slot 44 formed in one of the side walls of said arm, and secured to said screw and carried thereby is a metal strip 45 which is adapted to close the slot 44 at all times. The set screw 43 and strip 45 are longitudinally adjustable, the slot 44 permitting movement of said set screw. This trip lever has a curved trip or stop arm 46 projecting upwardly through a longitudinal slot 47 formed in the upper wall of the skid or guide arm, the lever proper projecting downwardly through a similar slot in the lower wall of said arm. The lower extremity of said lever serves as an indicator by means of which the lever is set at the desired point to cause the return of the reproducer from such point or slightly beyond. The trip lever is also provided with a lateral arm 48 having a hook end 49 which is adapted to hook over a releasing lever 50 pivotally connected to a bracket 51 secured to one of the side walls of the skid or guide arm, as at 52. Said bracket has its upper portion offset, as at 53, to provide the necessary space behind the same for free movement of the closure strip 45.

The releasing lever 50 is provided with a depending portion 54 pivotally connected to a lock bar 55 extending lengthwise and projecting outwardly through the end of the skid or guide arm and entering the radial slot 39 in the eccentric wheel 35, thus holding said wheel in normal position out of contact with the record disk. The releasing lever 50 also has a hook 56 which is preferably arranged close to its axis and to which is fastened one end of a retractile spring 57 that extends downwardly and has its other end attached to a hook 58 formed on the bracket 51, said spring serving to hold the releasing lever 50 in its elevated position whereby the trip lever 42 with its stop arm 48 is maintained in normal position, and whereby the lock bar 55 is held in projected position with the end thereof entered into the radial notch 39 of the eccentric wheel.

Adjustable between the trip lever 42 and the pivoted end of said skid or guide arm is a stop 59 which is movable lengthwise along said skid or guide arm and is held in any adjusted position by a set screw 60. Projecting downwardly from said stop 59 is an indicating finger 59ª whereby the stopping point of the reproducer on its return movement is indicated. When the entire record is to be played, the trip lever 42 is adjusted so that its stop arm 46 will be actuated by the guide arm or roller 34 the instant the record is completed. At such time the movement of said stop arm causes the hooked extension 49 of the trip lever 42 to depress the releasing arm 50 against the action of the spring 57, whereupon the lock bar 55 is caused to move in the direction of the arrow 61, Fig. 10, the projecting end thereof being therefore withdrawn from the radial slot 39 of the eccentric wheel. The wheel held under arrest during the normal position of the parts is thus released and the weight or weights 41 of said wheel immediately cause the latter to rotate so as to bring the peripheral edge of the same in contact with the record disk, and since said disk is rotating, the eccentric wheel 35 is caused to continue rotating on its axis with the result that the major portion or throw of the wheel passes in contact with the disk and in doing so causes the skid or guide arm 28 to rise, as shown in Fig. 3. During the rising movement of said skid or guide arm the sound box 11 of the reproducer is elevated to move the needle thereof away from the record disk, and in case the parts are so adjusted that the guide wheel or roller 34 has not been traveling in contact with the skid or guide arm, it will be brought in contact with said skid or guide arm during the initial portion of the upward movement of the latter.

When the skid or guide arm is sufficiently elevated to provide the necessary inclination for returning the reproducer arm to its starting point, the guide wheel or roller 34 rides down the inclined skid or guide arm, and when it leaves the stop arm 46 of the trip lever 42, the spring 57 within said skid or guide arm acts to return the parts within said arm to normal position, with the result that the projecting end of the lock bar 55 is spring-pressed against the face of the annular projection 38 on the eccentric wheel. The reproducer moves outwardly on its return stroke until the guide wheel or roller 34 comes in contact with the stop 59, which we will assume is set at the starting point of the record. The parts in action bring the reproducer to starting position before the eccentric wheel has made a complete revolution, and upon said wheel completing a full revolution the radial notch 39 on the eccentric is again brought in line with the projecting end of the lock bar 55 which immediately enters said notch and locks the eccentric wheel against further movement, at the same time holding said eccentric wheel out of contact with the record disk.

It is to be noted that the gradually increasing distance between the axis and the peripheral edge of the wheel causes a gradual rising of the skid or guide arm during the first half of the revolution of the eccentric; and during the last half, the gradually diminishing distance between the axis and the peripheral edge of the wheel causes a gradual lowering of the skid or guide arm, with the result that the needle of the sound box is gently lowered against the record disk without any possibility of injuring the latter or the needle. In fact, this positioning of the needle against the record disk is done more carefully by the automatic means provided than is possible manually.

By providing adjustable stops for the reproducer for both its forward and return movements, records of different lengths can be repeated without undesirable rests between the finish and recommencement of the piece, and this is particularly desirable when repeating records for dancing. It is apparent also that by reason of the horizontal and vertical pivot arrangement between the skid or guide arm and its support, said arm may be swung upwardly on the horizontal pivot and horizontally on its vertical pivot to swing the device from the position shown in full lines in Fig. 7 to that shown in dotted lines, it being thus completely out of the way of the rotating or turn table and permits the placing of record disks on said table without interference. During such times the reproducing machine is placed in condition for conveniently applying record disks to be played without repeating.

My invention is susceptible to various changes in construction and arrangement of parts, and it is apparent that certain parts thereof may be omitted and others substituted without departing from the principle involved or sacrificing any of the advantages of the invention, as set forth in the appended claims.

Having thus described my invention, what I claim is,—

1. A record repeating device comprising a guide member, eccentric means on said guide member for lifting the same, and controlling mechanism adapted to be actuated by a movable part of a sound reproducing machine to permit said eccentric means to be brought into action.

2. A record repeating device comprising a support, a guide member pivotally secured at one end to said support and normally retained in horizontal position, eccentric means at the other end of said guide member for lifting said member into inclined position, including a rotatable member having its axis horizontal or substantially so, and controlling mechanism carried by said guide member and adapted to be actuated by a movable member of a sound reproducing machine.

3. In a record repeating device, the combination of a support having a vertically-disposed rotatable spindle provided with a forked upper end, means for limiting the rotation of said spindle in either direction, and a guide bar pivotally secured at one end to the forked upper end of said spindle.

4. A record repeating device comprising a guide arm pivotally secured at one end and having eccentric means at its other end for gradually swinging said arm upwardly and also for controlling the downward swinging movement of the same, said means being adapted to be actuated by a movable member of a sound reproducing machine.

5. A record repeating device comprising a guide bar pivotally secured at one end, a weighted eccentric arranged for rotation at its other end, means for retaining said eccentric in inoperative position, and means adapted to be actuated by a movable part of a sound reproducing machine for actuating said retaining means to release said eccentric and permit the same to operate.

6. The combination with a sound reproducing machine having an oscillatory reproducer and a rotatable table on which a disk record is adapted to be placed, of a guide arm pivotally secured at one end and normally held in horizontal position, an eccentric rotatably arranged at the other end of said guide arm and normally out of contact with said disk record, and means carried by said guide arm adapted to be actuated by said reproducer for permitting rotation of said eccentric so as to contact with said disk record and be rotated thereby for inclining said guide arm and causing the sound box of said reproducer to return to the desired point for repeating the disk record, or a portion thereof.

7. A record repeating device comprising a hollow guide arm pivotally secured at one end, an eccentric rotatably mounted at its other end and having its throw directed upwardly, a trip lever pivotally secured within said guide arm and having a portion extending outwardly therefrom to serve as a stop, said trip lever being adjustable lengthwise on said guide arm, a releasing lever pivotally secured within said guide arm and adapted to be actuated by said trip lever, and a lock bar pivotally secured to said releasing lever and having its free end extending from the free end of said guide arm in locking engagement with said eccentric, and a spring for retaining said trip lever, said releasing lever and said lock bar in normal position, said stop being adapted to be engaged by the reproducer of a sound reproducing machine for actuating said trip lever and releasing said lock bar through the medium of said releasing lever, whereby said eccentric may rotate into contact with a disk record and be driven thereby for swinging said guide arm upwardly and thence downwardly into normal position, for the purpose described.

8. The combination with a sound reproducing machine having an oscillating reproducer and a rotatable table on which a disk record is adapted to be placed, of a pivoted guide arm, and means carried by said guide arm and adapted to engage the face of said disk record to cause said guide arm to be elevated, said means being placed into action by said oscillating reproducer.

In testimony whereof I affix my signature.

RASMUS P. CHRISTENSEN.